United States Patent
Vernaza et al.

(10) Patent No.: US 10,705,531 B2
(45) Date of Patent: Jul. 7, 2020

(54) GENERATIVE ADVERSARIAL INVERSE TRAJECTORY OPTIMIZATION FOR PROBABILISTIC VEHICLE FORECASTING

(71) Applicant: NEC Laboratories America, Inc., Princeton, NJ (US)

(72) Inventors: Paul Vernaza, Sunnyvale, CA (US); Wongun Choi, Lexington, CA (US); Nicholas Rhinehart, Pittsburgh, PA (US)

(73) Assignee: NEC Corporation, Tokyo (JP)

( * ) Notice: Subject to any disclaimer, the term of this patent is extended or adjusted under 35 U.S.C. 154(b) by 97 days.

(21) Appl. No.: 16/145,649

(22) Filed: Sep. 28, 2018

(65) Prior Publication Data

US 2019/0094867 A1   Mar. 28, 2019

Related U.S. Application Data

(63) Continuation of application No. 16/145,555, filed on Sep. 28, 2018.
(Continued)

(51) Int. Cl.
*G06K 9/00* (2006.01)
*G05D 1/02* (2020.01)
*H04N 7/18* (2006.01)
*G05D 1/00* (2006.01)
*G08G 1/00* (2006.01)
(Continued)

(52) U.S. Cl.
CPC ............ *G05D 1/0214* (2013.01); *B60Q 9/008* (2013.01); *G01C 21/00* (2013.01); *G05D 1/0088* (2013.01); *G05D 1/0246* (2013.01); *G06K 9/00624* (2013.01); *G06K 9/00791* (2013.01); *G06K 9/00805* (2013.01); *G06K 9/00825* (2013.01); *G06K 9/6256* (2013.01); *G06K 9/6262* (2013.01); *G06K 9/6271* (2013.01); *G06K 9/726* (2013.01); *G06N 3/0445* (2013.01);
(Continued)

(58) Field of Classification Search
CPC .................................. G06K 9/00; G08G 1/00
USPC ....................................................... 382/103
See application file for complete search history.

(56) References Cited

U.S. PATENT DOCUMENTS

2019/0291727 A1* 9/2019 Shalev-Shwartz ....... G07C 5/02

OTHER PUBLICATIONS

Ratliff, "Maximum Margin Planning", Proceedings of 23rd International Conference of Machine Learning, Jun. 2006, pp. 729-736.
(Continued)

*Primary Examiner* — Abolfazl Tabatabai
(74) *Attorney, Agent, or Firm* — Joseph Kolodka (57) ABSTRACT

Systems and methods for predicting vehicle behavior includes capturing images of a vehicle in traffic using an imaging device. Future behavior of the vehicle is stochastically modeled using a processing device including an energy-based model stored in a memory of the processing device. The energy-based model includes generating a distribution of possible future trajectories of the vehicle using a generator, sampling the distribution of possible future trajectories according to an energy value of each trajectory in the distribution of possible future trajectories an energy model to determine probable future trajectories, and optimizing parameters of each of the generator and the energy model using an optimizer. A user is audibly alerted with a speaker upon an alert system recognizing hazardous trajectories of the probable future trajectories.

20 Claims, 7 Drawing Sheets

Related U.S. Application Data

(60) Provisional application No. 62/564,521, filed on Sep. 28, 2017.

(51) Int. Cl.
  *G06K 9/62* (2006.01)
  *G01C 21/00* (2006.01)
  *B60Q 9/00* (2006.01)
  *G06K 9/72* (2006.01)
  *G06N 3/04* (2006.01)
  *G06N 3/08* (2006.01)

(52) U.S. Cl.
  CPC ............. *G06N 3/0472* (2013.01); *G06N 3/08* (2013.01); *G08G 1/00* (2013.01); *H04N 7/185* (2013.01)

(56) References Cited

OTHER PUBLICATIONS

Ziebart, "The Principle of Maximum Causal Entropy for Estimating Interacting Processes", IEEE Transactions on Information Theory, Mar. 2013, pp. 1966-1980.

Levine, "Continuous Inverse Optimal Control with Locally Optimal Examples", Proceedings of the 29th International Conference of Machine Learning, Jul. 2012, pp. 1-8.

Lee, "Desire: Distant Future Prediction in Dynamic Scenes with Interacting Agents", IEEE Conference on Computer Vision and Pattern Recognition, Jul. 2017, pp. 1-10.

* cited by examiner

GENERATIVE ADVERSARIAL INVERSE TRAJECTORY OPTIMIZATION FOR PROBABILISTIC VEHICLE FORECASTING

BACKGROUND

Technical Field

The present invention relates to vehicle forecasting and more particularly to generative adversarial inverse trajectory optimization for probabilistic vehicle forecasting.

Description of the Related Art

Behavior prediction based on visual information benefits from predicting not just one possible future, but all possible futures. However, predicting all possible futures is a high dimensional problem because each future possibility is a high-dimensional object with many degrees of freedom. This high dimensionality can lead to overfitting to training data because there is insufficient data as to all possible outcomes. Thus, a naïve model can develop spurious correlations between high-dimensional inputs and outputs. Moreover, a high-dimensional problem such as behavior prediction can be very computationally expensive, particularly when all possible futures are to be predicted.

Furthermore, evaluation of predictions is difficult because different metrics can have different deficiencies. Thus, choosing a particular metric for evaluation can damage the model in a particular way. In fact, some metrics cannot be optimized during training. Thus, evaluation of the predictions may be different from training evaluations, leading to poorly optimized models.

SUMMARY

According to an aspect of the present principles, a system is provided for vehicle behavior prediction. The system includes an imaging device that captures images of a vehicle in traffic. A processing device including an energy-based model is stored in a memory of the processing device to stochastically model future behavior of the vehicle. The energy-based model includes a generator that produces a distribution of possible future trajectories of the vehicle, an energy model that samples the distribution of possible future trajectories according to an energy value of each trajectory in the distribution of possible future trajectories to determine probable future trajectories, and an optimizer that optimizes parameters of each of the generator and the energy model. An alert system recognizes hazardous trajectories of the probable future trajectories and generates and audible alert using a speaker.

According to another aspect of the present principles, a method is provided for vehicle behavior prediction. The method includes capturing images of a vehicle in traffic using an imaging device. Future behavior of the vehicle is stochastically modeled using a processing device including an energy-based model stored in a memory of the processing device. The model includes an energy function that assigns an approximate likelihood to any possible future vehicle trajectory, a generator that samples vehicle trajectories according to the likelihood assigned by the energy function, energy model and optimizing parameters of each of the energy function and the energy model using an optimizer. A user is audibly alerted with a speaker upon an alert system recognizing hazardous trajectories of the probable future trajectories.

These and other features and advantages will become apparent from the following detailed description of illustrative embodiments thereof, which is to be read in connection with the accompanying drawings.

BRIEF DESCRIPTION OF DRAWINGS

The disclosure will provide details in the following description of preferred embodiments with reference to the following figures wherein.

DETAILED DESCRIPTION OF PREFERRED EMBODIMENTS

In accordance with the present principles, systems and methods are provided for predicting future trajectories.

In one embodiment, a model is trained and applied to predict future vehicle trajectories. To more accurately predict all possible future trajectories, the model predicts uncertain goal-directed behavior according to uncertainty using a conditional probability model. As the probability model is represented in an unnormalized form, exact inference is intractable. Hence, a generator is trained to produce samples from the learned probability model. The generator is represented as a sequence of invertible policy evaluations, which allows efficient evaluation of the generator and its probability density. To prevent overfitting of data, the conditional probability model is represented as a structured Gibbs distribution (or a structured energy function). Thus, the log-probability of a putative behavior is proportional to a sum of factors, including, e.g., an obstacle collision cost score and an acceleration penalty, among other factors. As a result, in addition to preventing overfitting, the data is represented according to goal-directed behavior, such as, e.g., obstacle avoidance.

The generator's policy is trained using variational inference to match the Gibbs distribution by adapting the policy parameters to induce a distribution over simulated paths that cover the modes of the Gibbs distribution. This is enabled by the invertibility of the generator, which subsequently allows the use of the reparameterization trick to adapt the policy parameters according to a gradient-based variational inference scheme. This training can be continued at test-time to continually improve the accuracy of predicted behaviors according to minimizing costs.

The Gibbs distribution, on the other hand, is trained to minimize an error function defined as the expected difference in Gibbs energies under the training data and paths generated by the generator. The Gibbs distribution parameters are adapted by back-propagating the error to the parameters and performing gradient descent.

Embodiments described herein may be entirely hardware, entirely software or including both hardware and software elements. In a preferred embodiment, the present invention is implemented in software, which includes but is not limited to firmware, resident software, microcode, etc.

Embodiments may include a computer program product accessible from a computer-usable or computer-readable medium providing program code for use by or in connection with a computer or any instruction execution system. A computer-usable or computer readable medium may include any apparatus that stores, communicates, propagates, or transports the program for use by or in connection with the instruction execution system, apparatus, or device. The medium can be magnetic, optical, electronic, electromagnetic, infrared, or semiconductor system (or apparatus or device) or a propagation medium. The medium may include a computer-readable storage medium such as a semiconductor or solid state memory, magnetic tape, a removable computer diskette, a random access memory (RAM), a read-only memory (ROM), a rigid magnetic disk and an optical disk, etc.

Each computer program may be tangibly stored in a machine-readable storage media or device (e.g., program memory or magnetic disk) readable by a general or special purpose programmable computer, for configuring and controlling operation of a computer when the storage media or device is read by the computer to perform the procedures described herein. The inventive system may also be considered to be embodied in a computer-readable storage medium, configured with a computer program, where the storage medium so configured causes a computer to operate in a specific and predefined manner to perform the functions described herein.

A data processing system suitable for storing and/or executing program code may include at least one processor coupled directly or indirectly to memory elements through a system bus. The memory elements can include local memory employed during actual execution of the program code, bulk storage, and cache memories which provide temporary storage of at least some program code to reduce the number of times code is retrieved from bulk storage during execution. Input/output or I/O devices (including but not limited to keyboards, displays, pointing devices, etc.) may be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

Figure 1:
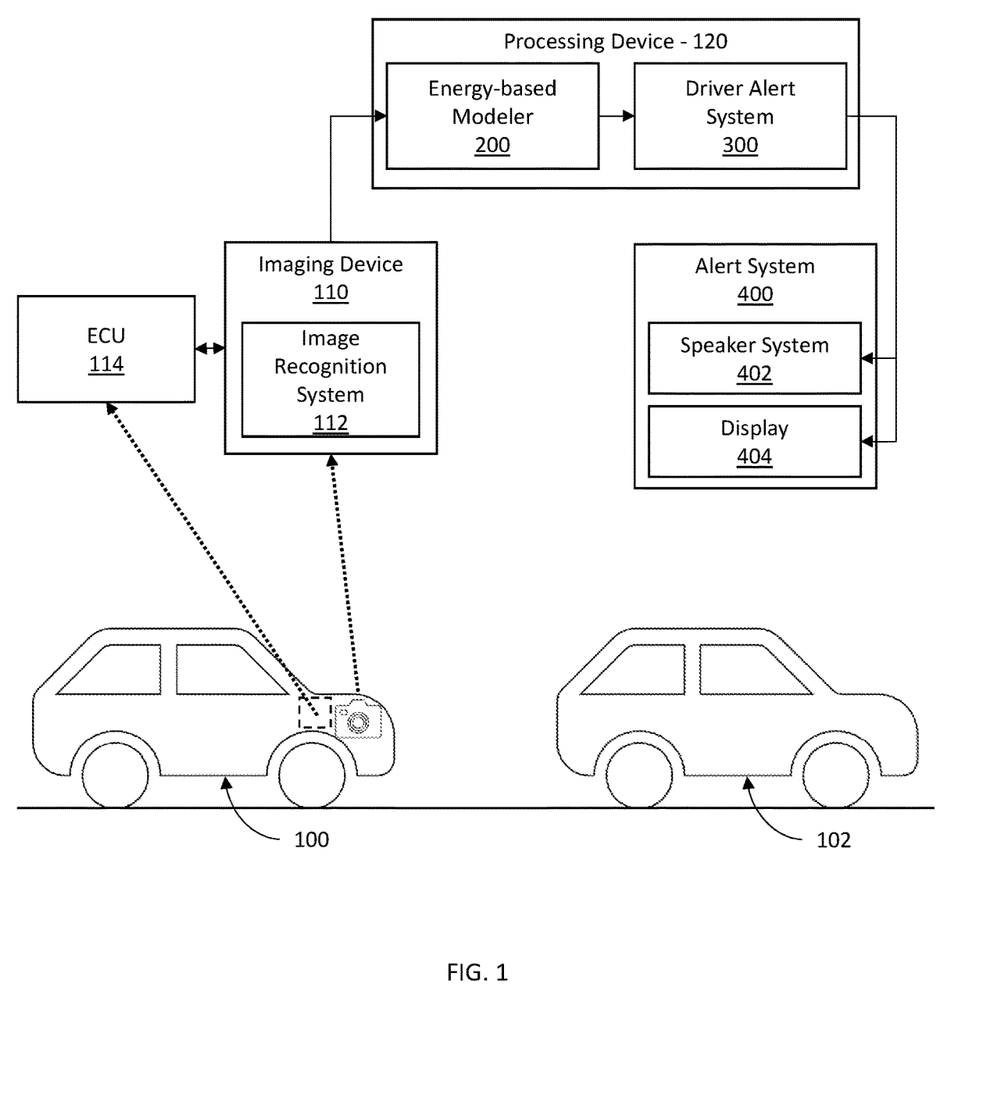
FIG. 1 is a block/flow diagram illustrating a high-level system/method for a vehicle behavior prediction system with driver alerts, in accordance with the present principles.

Referring now in detail to the figures in which like numerals represent the same or similar elements and initially to FIG. 1, a high-level system/method for a vehicle behavior prediction system with driver alerts is illustratively depicted in accordance with one embodiment of the present principles.

In one embodiment, a vehicle 100 includes a system for predicting behavior of a second vehicle 102. The system for predicting behavior includes an imaging device 110 and a processing device 120.

The imaging device 110 can be positioned on or within the vehicle 100 such that the imaging device 110 can capture images of vehicles ahead, such as, e.g., the second vehicle 102. For example, the imaging device 110 can be attached, e.g., to the windshield, behind an opening in the front of the vehicle 100, or in any other suitable location for detecting images ahead. The images detected by the imaging device 110 can include, e.g., visible light images, infrared (IR) images, ultraviolet (UV) images, or any images detected in any other range of the electromagnetic (EM) spectrum. In some possible embodiments, the images could even be based on acoustic signals similar to, e.g., sonar. Thus, the imaging device 110 can include, e.g., a digital image sensor, an IR sensor, a charge coupled device (CCD), an UV sensor, or other image sensing device. The imaging device 110 can generate a series of images objects ahead, such as the second vehicle 102. The series of images can thus provide current behavioral information, such as, e.g., positional information and current trajectory of objects.

However, additional information can be used in conjunction with the images to provide velocity and acceleration information, including changes of direction. For example, information from the electronic control unit (ECU) 114 of the vehicle 100 can communicate with the imaging device 110 to provide information related to position and/or movement of the vehicle 100. Thus, the position and/or movement of the vehicle 100 can be used to augment the relative position from the series of images of the objects ahead, such as, e.g., the second vehicle 102, to determine acceleration and velocity.

Moreover, determining the current behavioral information of a vehicle ahead, such as the second vehicle 102, can include an image recognition system 112 for recognizing the second vehicle 102 as well as environmental features, such as, e.g., intersections, cross streets, curves, turns, lanes, pedestrians, bicyclists, vegetation, and other objects present in a driving environment such as a road. The image recognition system 112 can recognize the objects using, e.g., semantic segmentation with a neural network such as, e.g., a convolutional neural network (CNN), a recurrent neural network (RNN), or other semantic segmentation technique.

To facilitate determining current and future trajectories in relation to the environment, such as, e.g., relative to roads, building, vehicles, and other features including those described above, the image recognition system 112 can also include a component for generating a bird's eye view or top down view of the vehicle 100 and the surrounding environment. The bird's eye view version of an image can depict the second vehicle 102 in relation to the road ahead and any cross streets or intersections as well as other vehicles and objects in the road. As such, relative locations of the environmental features can be taken into account more efficiently when determining future trajectories of the second vehicle 102.

Thus, the processing device 120 can receive the bird's eye view into from the imaging device 110 to generate a prediction of future trajectories of the second vehicle 102. The processing device 120 can include, e.g., a computing system such as, e.g., a processor, a memory device, a storage device and other components of a computing device. As a result, the bird's eye view can be stored in a memory or a storage component of the processing device such that the processing device 120 can implement an energy-based modeler 200 including with the processing device 120 in, e.g., a memory or storage and executed by a processor. The energy-based modeler 200 models a distribution of a variety of possible future trajectories through the bird's eye view of the second vehicle 102.

The energy-based modeler 200 can implement energy analysis on the bird's eye view image to determine the most probably future trajectories. For example, embodiments of the present invention can include, e.g., assigning energy values to various locations and objects in the image, where energies of objects other than a road is increased and the energy associated with the road is pushed down. Through training, the energies associated with various objects can be adjusted, including decreasing an energy measure for true trajectories obtained from, e.g., a training data set.

Using the energies, most likely future trajectories can be modeled by minimizing the energy. The energies, therefore, can provide a goal-oriented methodology to trajectory prediction where the second vehicle 102 is assumed to behave according to the least energy usage. Such a methodology takes into account the underlying uncertainty of the future behavior of the second vehicle 102, and models potential future trajectories in view of the uncertainty. Accordingly, lower energy trajectories are considered to have a higher probability of occurrence. As a result, the energy-based modeler 200 takes into account the environment to determine the most likely future trajectory of the second vehicle 102 according to a determination of the most desirable trajectories based on the energy corresponding to the features of the environment.

The predicted future trajectories can be analyzed and acted upon by a driver alert system 300 included with the processing device 120. While in this embodiment, the driver alert system 300 is included with the processing device 120, such that the processing device 120 can perform operations for analysis of the future trajectories and determines for driver alerts, the driver alert system 300 can alternatively be separate from the processing device 120. For example, the driver alert system 300 can include, e.g., a separate processor, memory and/or storage for receiving and acting upon the future trajectories predicted by the energy-based modeler 200.

The driver alert system 300 receives the future trajectories and determines a potentially hazardous future behavior of the second vehicle 102. For example, the driver alert system 300 can recognize, e.g., an unsafe lane change, an improper or illegal turn, a collision, or other unsafe behavior. In recognizing the hazardous trajectory, the driver alert system 300 can generate a notification for the driver of the vehicle 100. For example, the driver alert system 300 can generate an audible alert through the vehicle's 100 speaker system 402. Alternatively, the driver alert system 300 can send an alert to a display 404, such as, e.g., a head's up display, a gauge display, an infotainment display, or other display in communication with the driver alert system 300. The displayed alert can include a general alert that does not specify the type of hazardous behavior predicted, or the alert can identify the type of behavior or trajectory through, e.g., a spoken description, a depiction of the behavior on the display, a description on the display, or any other method of depicting the hazardous trajectory.

Figure 2:
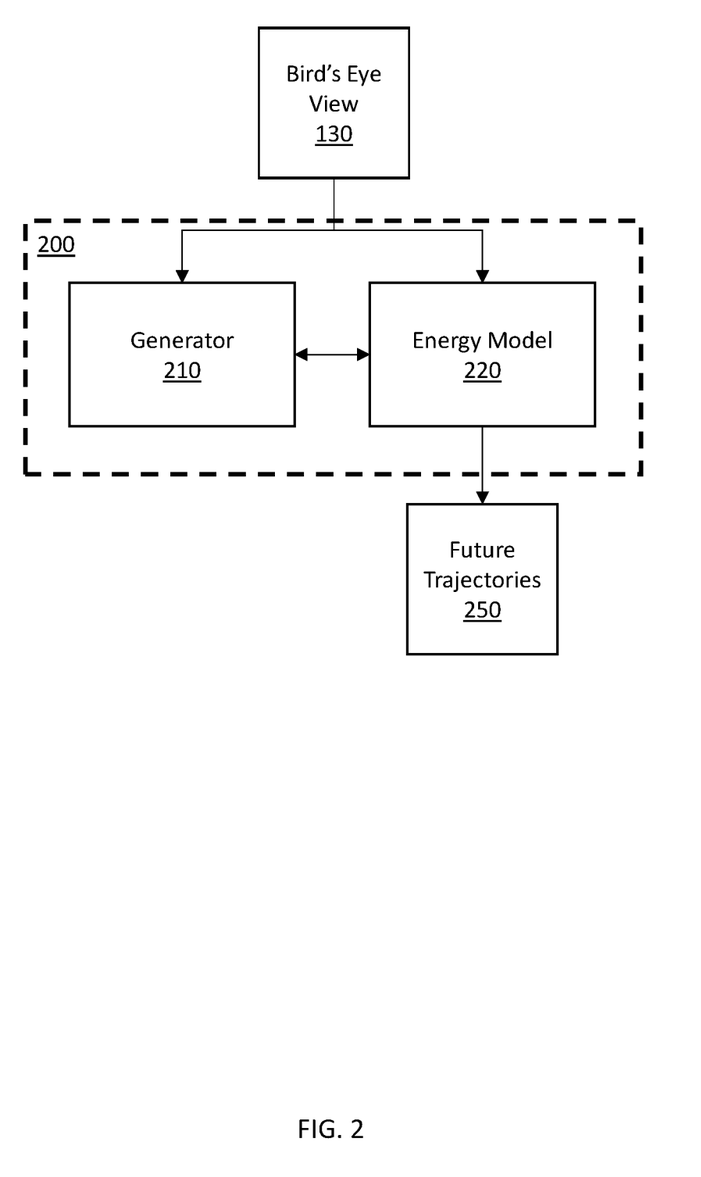
FIG. 2 is a block/flow diagram illustrating a system/method for energy-based trajectory prediction, in accordance with the present principles.

Referring now to FIG. 2, a system/method for energy-based trajectory prediction is illustratively depicted in accordance with an embodiment of the present principles.

According to an embodiment of the present invention, the energy-based modeler 200 includes a generator 210, an energy model 220. The energy-based modeler 200, e.g., stored in a memory and executed by a processor, receive a bird's eye view 130 of a driving environment into memory, such as, e.g., a roadway, and predicts a distribution of future trajectories 250 of a vehicle.

To model the future trajectories 250, the energy model 220 and the generator 210 cooperate to improve modeling through energy-based, and thus, goal-oriented prediction by leveraging the energy models of the energy model 220, while concurrently improving training with variational inference by leveraging the relatively easy to train generator 210.

According to an aspect of the present invention, the generator 210 can be leveraged by receiving the bird's eye view 130 and generating an initial distribution of future trajectories according to an analytic and stochastic policy. Thus, the generator 210 simulates the distribution of trajectories according to learned generator parameters $\theta_g$. The generator 210 uses the bird's eye view 130 to model possible future trajectories according to a stochastic policy taking into account the position and/or acceleration of the vehicle. Accordingly, the generator 210 can include, e.g., a generative model such as, e.g., a neural network, multilayer perceptron, or other networks and combinations thereof.

The generative model is trained to generate a set of initial future trajectories according to learned generator parameters $\theta_g$ stored in, e.g., a memory or storage. The generator parameters $\theta_g$ can be to provide a stochastic policy that better examines the current context using, e.g., static contextual features of the environment. Thus, according to a current state and trajectory, the generator 210 models possible future trajectories as a distribution of trajectories.

Because the generator 210 is a generative model using learned generator parameters $\theta_g$, the generator 210 is easily trained. However, the generator 210 may not capture goal-oriented behavior and can be prone to overfitting in complex and highly multi-dimensional applications such as, e.g., navigating a road environment. As a result, the energy model 220 can be leveraged to provide goal-driven behavior modeling that can take into account uncertainty in an environment.

Accordingly, the initial distribution of future trajectories can be analyzed by the energy model 220 to determine trajectory energies. Thus, the energy model 220, which can be e.g., stored in a memory, can determine a set of future trajectories 250 according to energies of the initial distribution of future trajectories using, e.g., a processor. The energies of each modeled trajectory is affected by the surrounding environment. For example, a roadway can decrease energy while another vehicle can increase energy. Thus, each possible trajectory can be evaluated according to the total energy of the trajectory as determined by the features along that trajectory. The energy contribution of each feature in an environment can be learned according to a set of energy parameters $\theta_H$, e.g., stored in a memory or a storage, as applied with a suitable energy model, such as, e.g., a Gibbs free energy model, among others.

The energy function can include, e.g., a cost map with a structure that is hand-crafted for an environment depicted in the bird's eye view. The cost map can take into account features of the environment, such as, e.g., the features described above, as well as features that are unrecognized. Thus, by adapting the learned energy parameters $\theta_H$, energy along a trajectory can be increased for particular features as well as for unknown or unrecognized features, thus incorporating the uncertainty of the image.

As a result, the energy model 220 provides a model that effectively models the many degrees of freedom of, e.g., a driving environment, while avoiding overfitting. By applying the energy model 220 to the initial distribution of future trajectories generated by the generator 210, the energy model 220 and the generator 210 can each be leveraged to provide both a trainable system using the invertible simulator of the generator 210 while improving goal-oriented behavior modeling using the energy model 220.

Figure 3:
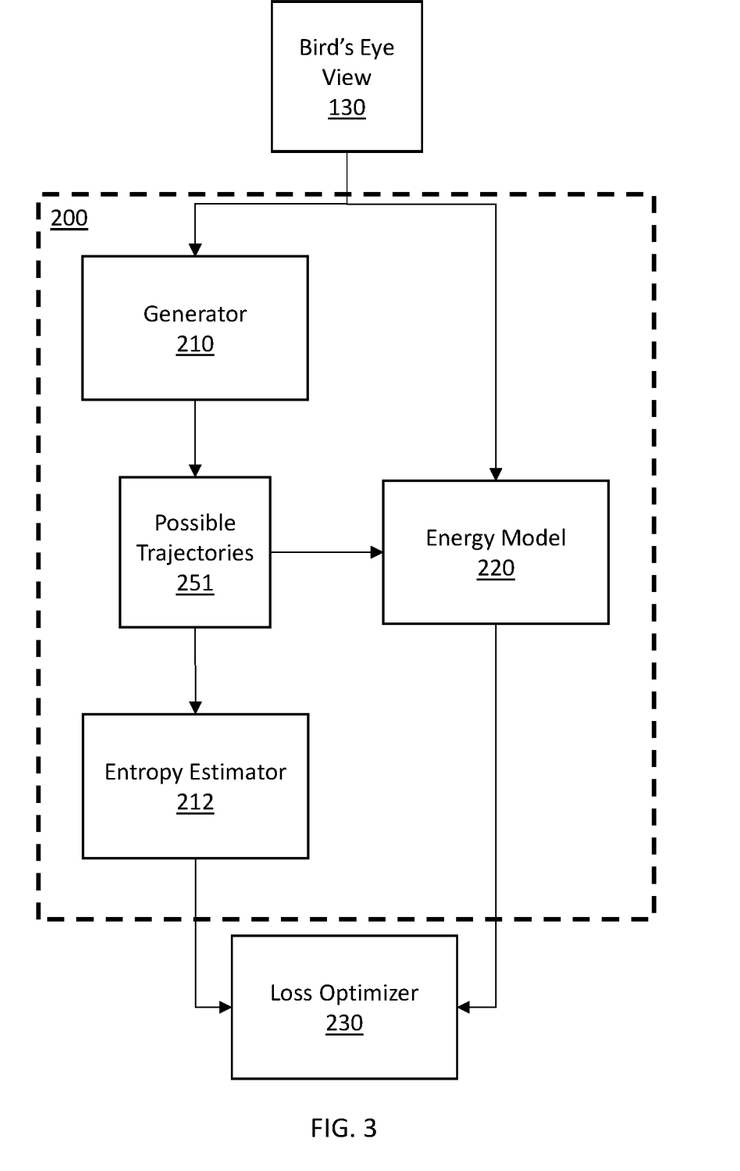
FIG. 3 is a block/flow diagram illustrating a system/method for discriminative training of a trajectory prediction generator, in accordance with the present principles.

Referring now to FIG. 3, a system/method for discriminative training of a trajectory prediction generator is illustratively depicted in accordance with an embodiment of the present principles.

According to an embodiment of the present invention, the generator 210 generates a sample of possible trajectories 251 from visual side information including, e.g., a bird's eye view 130 of a scene. The generator 210 can, e.g., use a combination of generator parameters $\theta_g$, a random or latent noise vector as well as visual side information including the bird's eye view 130 to generate an initial distribution of future trajectories. The visual side information can include, e.g., inputs from the bird's eye view 130 such as, e.g., visual features, vehicle position and orientation, and latent information including, e.g., positional information to determine acceleration, inputs from the bird's eye view 130 such as, e.g., visual features, vehicle position and orientation, and latent information including, e.g., positional information to determine acceleration. Thus, as described above, the generator 210 can include, e.g., an invertible simulator employing a stochastic policy with the random noise vector to map random noise vectors to trajectories.

To train the generator parameters $\theta_g$, the i sample of possible trajectories 251 can be evaluated and optimized analytically through, e.g., discriminative training leveraging energy information provided by the energy model 220, such as, e.g., Gibbs free energy. Thus, the sample of possible trajectories 251 generated by the generator 210 can be provided to the energy model 220.

The energy model 220 can generate a cost map corresponding to energy costs of objects in the bird's eye view 130. As a result, the cost map provides a generalized application of energy to the environment of the bird's eye view 130 by increasing the energy imparted by known features of high energy as well as with unknown features. Thus, uncertainty in the environment is taken into account.

Therefore, the cost map can be used to assess the probability of each trajectory in the sample of possible trajectories 251. The energy of each trajectory can be evaluated according to the energies of features along the trajectory. For example, features and trajectories having a larger cost corresponds to a lower probability of occurrence. Similarly, a lower cost according to the cost map corresponds to a greater probability of occurrence. As a result, trajectories of high probability can be determined and emphasized by the energy model 220 to produce a distribution of future trajectories with corresponding energies.

The sample of trajectories 251 produced by the generator 210 is passed to the energy model 220, which evaluates the energies of the set of trajectories as described above. These energies are then passed to a loss optimizer 230, which adapts the generator parameters to minimize the energies of trajectories 251 sampled from the generator 210. However, the generator 210 may be susceptible to over-fitting. To reduce the risk of over-fitting the initial distribution of future trajectories, an entropy unit 212 evaluates the entropy of the generator 210 using the set of sampled trajectories 251. This entropy value is passed in addition to the energies of the trajectories 251 to the loss optimizer 230, which minimizes the sum of the energies of the trajectories 251 and the negative entropy. As a result, the entropy unit 212 compensates for the risk of over-fitting by encouraging a broad distribution of possible trajectories 251.

By training the generated trajectories 251 to have low values of energy evaluated by the energy model 220, the generator 210 is trained to, e.g., mimic goal-oriented behavior modeled by the energy model 220 including, e.g., obstacle avoidance and staying within the roadway. Thus, as the generator parameters $\theta_g$ are trained, the set of initial future trajectories more closely approximate true energy based modeling of future trajectories by matching the distribution of the energy model 220.

The energy and the negative entropy can be used to update the generator parameters $\theta_g$ by optimize the initial distribution of future trajectories. For example, the loss optimizer 230 can minimize an optimization function including the energy and the negative entropy using, e.g., equation 1 below:

$$\min_f \frac{1}{N_z} \sum_{z \sim q_0} H(f(z)) + \log(q(f(z))) - \log(p_0(f(z))), \quad \text{Equation 1}$$

where H is a parameterized energy function, $f$ is an invertible simulator function from the generator 210, q is a predicted distribution, $p_0$ is a real distribution, x is a predicted trajectory, z is visual side information (such as, e.g., features) and $N_z$ is a number of visual side information. The energy function of equation 1 can include terms to match, e.g., position, acceleration statistics, conditional accelerations, higher-order trajectory statistics such as curvatures, reasoning about other agents, as well as other factors affecting trajectory.

Thus, $\log(q(f(z)))$ is a negative entropy function as discussed above, which is incorporated into the Gibbs free energy function $$\frac{1}{N_z} \sum_{z \sim q_0} H(f(z)) + \log(q(f(z))) - \log(p_0(f(z))).$$

By optimizing the Gibbs free energy function with negative entropy, new generator parameters $\theta_g$ are determined that more accurately approximate the true distribution.

To further improve accuracy of the model, contextual information can be incorporated, such as, e.g., acceleration, trajectory, velocity, among others. As a result, equation 2 is arrived at as a contextual version of the model:

$$\min_f \frac{1}{N_z} \sum_{z \sim q_0} H(f(z; \phi_i); \phi_i) + \quad \text{Equation 2}$$
$$\log(q(f(z; \phi_i))) - \log(p_0(f(z; \phi_i))),$$

where $\phi_i$ is a matrix of contextual information.

Thus, the path optimizer 230 can minimize the Gibbs free energy model to generate new generator parameters $\theta_g$ as a gradient based optimization. The new generator parameters $\theta_g$ can then be implemented to update the policy of the generator 210 such that the policy distribution aligns with the probability model of the energy model 220.

Figure 4:
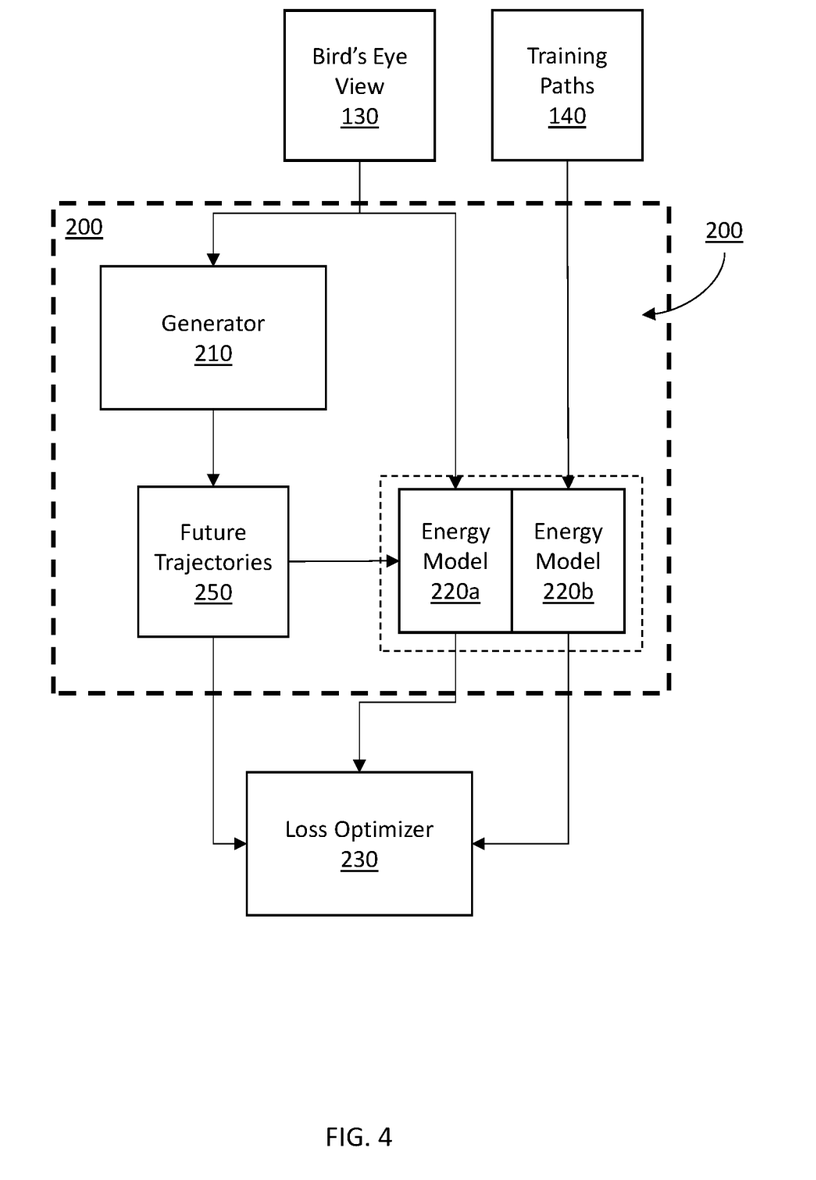
FIG. 4 is a block/flow diagram illustrating a system/method for training an energy model for trajectory prediction, in accordance with the present principles.

Referring now to FIG. 4, a system/method for training of an energy model is illustratively depicted in accordance with an embodiment of the present principles.

According to an embodiment of the present invention, a generator 210 trained to emulate the probability distribution of an energy model 220 can be used to train the energy model 220 according to, e.g., variational inference. To train the energy model 220 with the generator 210, the bird's eye view 130 is provided to the energy model 220 and to the generator 210 to determine a distribution of future trajectories 250 by, e.g. the generator 210 providing an initial distribution of future trajectories, as described above.

To determine variation in the energy model 220, the initial distribution of future trajectories is provided to the energy model 220 by the generator 210. The energy model 220 evaluates the initial distribution of future trajectories in energy model 220a to determine the distribution of future trajectories 250. Concurrently, the energy model 220 evaluates the probability distribution of the training paths 140 with energy model 220b. In this case, energy model 220a and energy model 220b are two instances of the energy model 220 to facilitate performing evaluation of both distributions in parallel. However, alternatively, the initial distribution of future trajectories and the training paths 140 can be evaluated successively using a single instance of the energy model 220. Other arrangements can be used such that both distributions are evaluated according to common energy parameters $\theta_H$.

By evaluating the training paths 140 and the initial distribution of future trajectories with the same energy parameters $\theta_H$, variational error in the energy model 220 can be inferred. Because the generator 210 approximates the probability distribution of the energy model 220, differences in probabilities between training paths 140 and future trajectories 250 indicates error in energy parameters $\theta_H$. Accordingly, the energy model 220 and the loss optimizer 230 utilize the results of the generator 210 to more effectively determine error in probability distributions imposed by the energy model 220. As a result, a difference between the energy of paths in the set of training paths 140 and the energy of the paths in the generated future trajectories 251 can be determined and optimized by the loss optimizer 230 using an optimization function such as, e.g., equation 3 below:

$$\max_H \sum_{x^*} -H(x^*) + \min_f \frac{1}{N_z} \sum_{z \sim q_0} H(f(z)) + \log(q(f(z))) - \log(p_0(f(z))),\quad \text{Equation 3}$$

where H is a parameterized energy function, $f$ is an invertible simulator function, q is a predicted distribution, $p_0$ is a real distribution, x is a predicted trajectory, x* is a true future trajectory provided by the training paths 140, z is visual side information (such as, e.g., features) and $N_z$ is a number of visual side information.

Equation 3 includes the optimization function for the energy of the future trajectories 250 as described in relation to equation 1 and equation 2 above. Thus, optimizing the loss between the energy of the future trajectories 250 and the training paths 140 results in an optimization of a difference between a maximizing function and minimizing function. Accordingly, the loss optimizer 230 implements adversarial loss optimization to determine new energy parameters $\theta_H$. The new energy parameters $\theta_H$ can be provided to the energy model 220 to refine the energy model and improve the accuracy of the energy model 220.

Thus, the energy-based modeler 200 can alternately train a policy for generating future trajectories 250 through variational inference to approximate a target distribution and updating the target distribution formed by the generator 210 to increase the likelihood of the observed data being represented. Employing such a variational inference technique with a generalized target distribution can increase the efficiency of training and implementing the model by eliminating the need for discrete optimization or reinforcement-based learning.

By continually updating the generator 210 to match the energy model 220, the generator 210 can act as a proxy for the energy model 220, such that the output of the generator 210 can be evaluated to infer the accuracy of the energy model 220. Because the generator 210 is more easily evaluated for loss than the energy model 220, training of the energy model 220 can be performed more efficiently and accurately. Moreover, the energy-based modeler 200 can learn both energy parameters $\theta_H$ and generator parameters $\theta_g$ concurrently. Thus, the energy-based modeler 200 is made faster and more efficient while also increasing accuracy.

Figure 5:
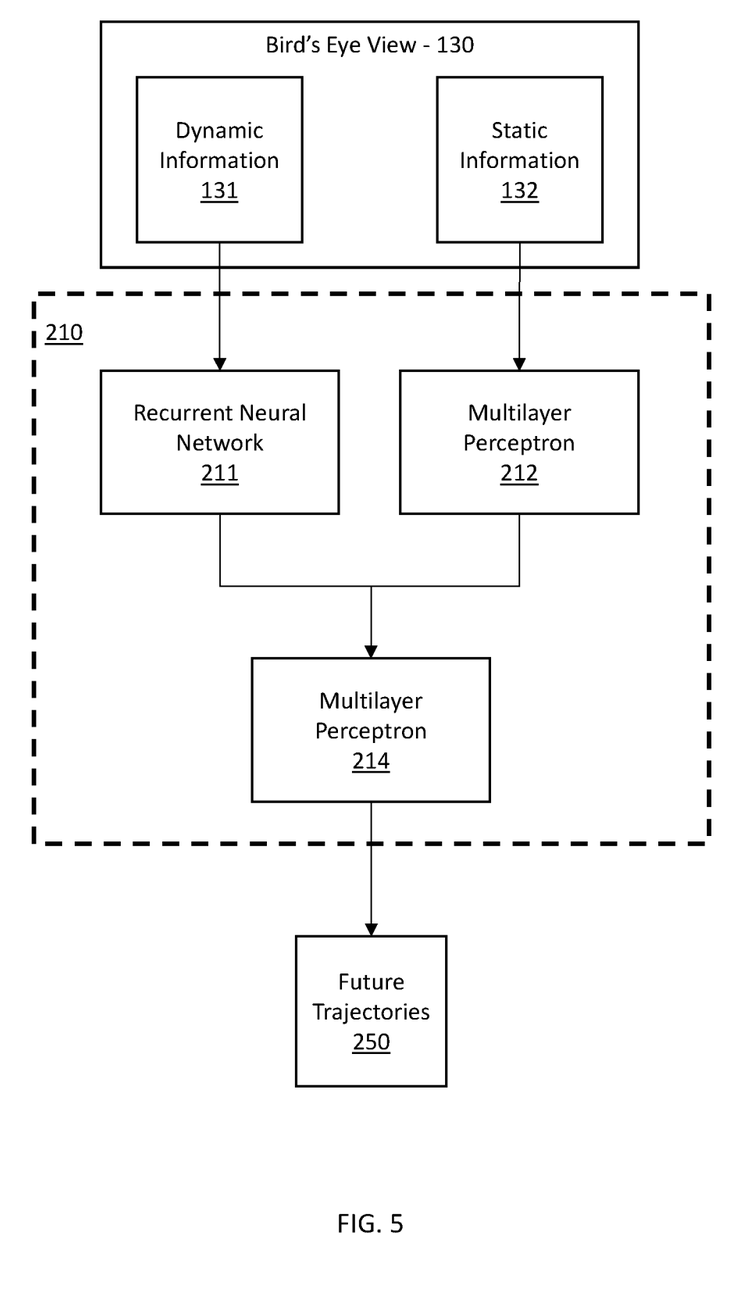
FIG. 5 is a block/flow diagram illustrating a system/method for generating trajectory predictions, in accordance with the present principles.

Referring now to FIG. 5, a system/method for generating trajectory prediction is illustratively depicted in accordance with an embodiment of the present principles.

As described above, the generator 210 can use a bird's eye view 130 feature image to generate a set of future trajectories 250. According to an embodiment of the present invention, the generator 210 can analyze both static information 132, such as, e.g., position, regarding a vehicle and dynamic information 131, such as, e.g., acceleration, regarding the vehicle. Because both position and acceleration can be taken into account, vehicle trajectory can be modeled using a motion equation such as, e.g., Verlet integration or Euler integration, among other techniques for determining motion. For example, the motion of the vehicle can be modeled with a Verlet equation, such as, e.g., equation 4 below:

$$x_{t+1} = 2x_t - x_{t-1} + (\mu(\vec{x};x_t \ldots x_1,\phi) + \sigma(\vec{x};x_t \ldots x_1,\phi)z)\delta t^2, \quad \text{Equation 4:}$$

where x is a trajectory, t is time, $\mu$ is a forcing function, $\sigma$ is an uncertainty function, $\phi$ is a matrix of contextual information and z is a random noise sequence. Here, the contextual information can include information regarding past states and behaviors of the vehicle, such as, e.g., positions, headings, features and semantic segmentation class scores, among others.

Because side information from the bird's eye view 130, as well as past bird's eye views stored in, e.g., a memory, can include information regarding both static information 132 and dynamic information 131, a function for predicting a future trajectory 250, such as, e.g., equation 4 above, can be parameterized. In such a parameterized function, there can be a forcing function corresponding to, e.g., position of the vehicle in the bird's eye view 130, and an uncertainty function corresponding to, e.g., accelerations of the vehicle. Both the forcing function and the uncertainty function can be differentiable. Accordingly, a stochastic next-step policy for the generator 210 can include a parameterized and differentiable model for accurate and efficient stochastic gradient descent optimization. Thus, the policy can be easily and efficiently optimized.

In one possible embodiment, the policy can be parameterized to separately evaluate static information 132 and dynamic information 131. To evaluate the static information 132, neural network, e.g., stored in a memory and executed by a processor, such as, e.g., a multilayer perceptron 212 can be used. The multilayer perceptron 212 can utilize the generator parameters $\theta_g$ to stochastically model the static information to predict a next-step position of the vehicle in the bird's eye view 130. However, other networks are contemplated to model the static information 132 and generate a prediction.

In contrast, according to one possible embodiment, the dynamic information 131 can be modeled using a different neural network, e.g., stored in a memory and executed by a processor, such as, e.g., a recurrent neural network 211 including, e.g., long short-term memory (LSTM), gated recurrent units (GRU), among other types of recurrent neural networks. The recurrent neural network 211 can model dynamic, time-series information. Thus, the recurrent neural network 211 can be used as in the generator 210 policy employing the generator parameters $\theta_g$ for modeling the dynamic information 131 and generating a next-step prediction.

The predicted dynamic information and the predicted static information can then be fused to generate next-step future trajectory 250. Fusing the static and dynamic predictions can be performed with a suitable neural network, e.g., stored in a memory and executed by a processor, utilizing the generator parameters $\theta_g$. For example, a multilayer perceptron 214 can model the combination of dynamic and static information using stochastic modeling to generate a trajectory. The trajectory includes a future trajectory 250 predicted from the dynamic information 131 and static information 132 in combination. Thus, future trajectories 250 can be accurately and efficiently predicted. And because the policy is parameterized into two fully differentiable functions, the policy can be efficiently refined using stochastic gradient descent to update the generator parameters $\theta_g$.

Figure 6:
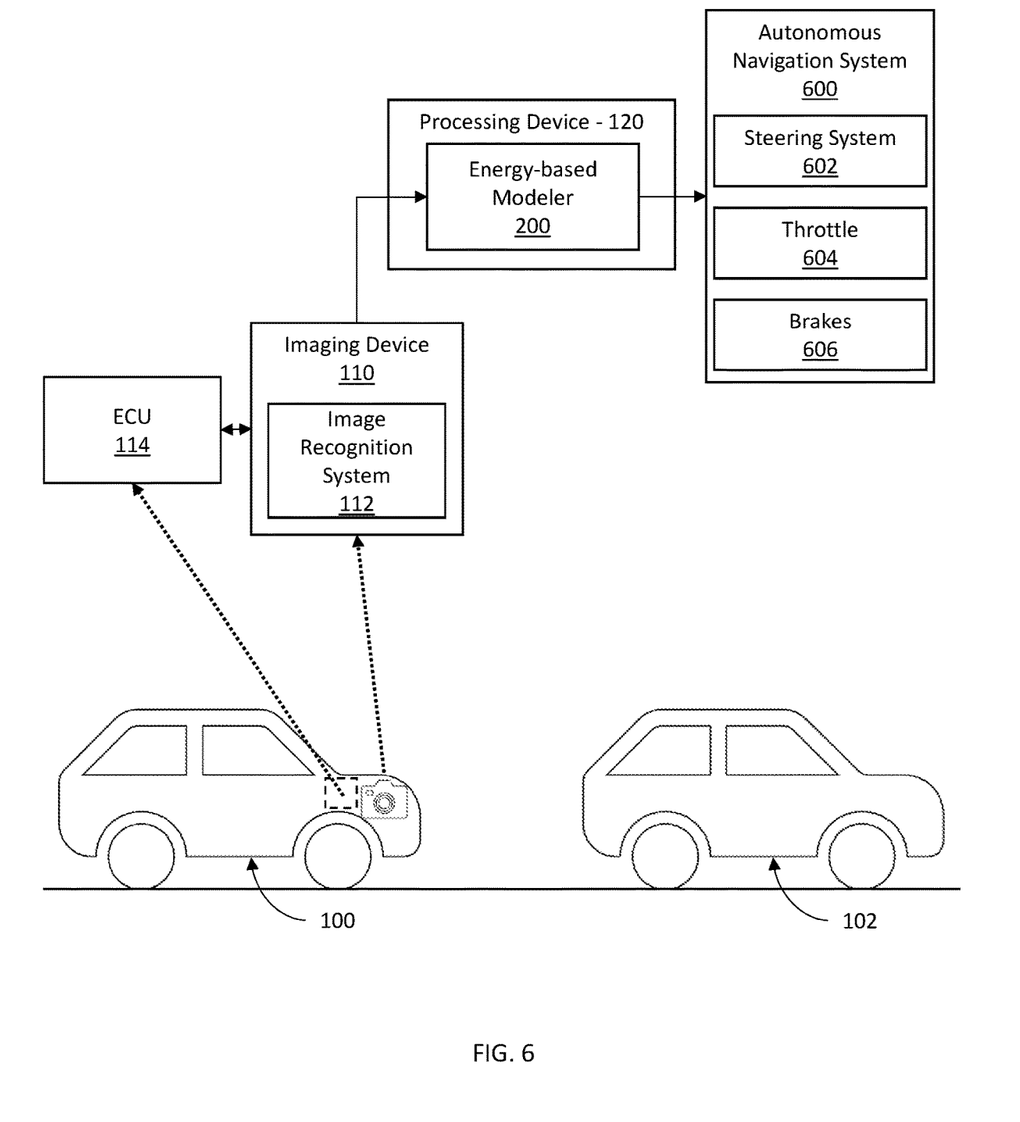
FIG. 6 is a block/flow diagram illustrating a system/method for a vehicle behavior prediction system autonomous vehicle operation, in accordance with the present principles.

Referring now to FIG. 6, a system/method for a vehicle behavior prediction system autonomous vehicle operation is illustratively depicted in accordance with an embodiment of the present principles.

In one embodiment, a vehicle 100 includes a system for predicting behavior of a second vehicle 102. The system for predicting behavior includes an imaging device 110 and a processing device 120. The vehicle 100 is depicted in the figure as a car, however, the vehicle 100 can include any suitable autonomous vehicle, such as, e.g., a drone, an autonomous ship or boat, an autonomous helicopter or plane, or any other vehicle.

The imaging device 110 can be positioned on or within the vehicle 100 such that the imaging device 110 can capture images of vehicles ahead, such as, e.g., the second vehicle 102. For example, the imaging device 110 can be attached, e.g., to the windshield, behind an opening in the front of the vehicle 100, or in any other suitable location for detecting images ahead. While the second vehicle 102 is depicted as a car, the second vehicle can include any moving object such as, e.g., a person, an animal, a vehicle, a drone, a ship, a boat, a helicopter, a plane, or any other moving thing.

The images detected by the imaging device 110 can include, e.g., visible light images, infrared (IR) images, ultraviolet (UV) images, or any images detected in any other range of the electromagnetic (EM) spectrum. In some possible embodiments, the images could even be based on acoustic signals similar to, e.g., sonar. Thus, the imaging device 110 can include, e.g., a digital image sensor, an IR sensor, a charge coupled device (CCD), an UV sensor, or other image sensing device. The imaging device 110 can generate a series of images objects ahead, such as the second vehicle 102. The series of images can thus provide current behavioral information, such as, e.g., positional information and current trajectory of objects.

However, additional information can be used in conjunction with the images to provide velocity and acceleration information, including changes of direction. For example, information from the electronic control unit (ECU) 114 of the vehicle 100 can communicate with the imaging device 110 to provide information related to position and/or movement of the vehicle 100. Thus, the position and/or movement of the vehicle 100 can be used to augment the relative position from the series of images of the objects ahead, such as, e.g., the second vehicle 102, to determine acceleration and velocity.

Moreover, determining the current behavioral information of a vehicle ahead, such as the second vehicle 102, can include an image recognition system 112 for recognizing the second vehicle 102 as well as environmental features, such as, e.g., intersections, cross streets, curves, turns, lanes, pedestrians, bicyclists, vegetation, and other objects present in a driving environment such as a road. The image recognition system 112 can recognize the objects using, e.g., semantic segmentation with a neural network such as, e.g., a convolutional neural network (CNN), a recurrent neural network (RNN), or other semantic segmentation technique.

To facilitate determining current and future trajectories in relation to the environment, such as, e.g., relative to roads, building, vehicles, and other features including those described above, the image recognition system 112 can also include a component for generating a bird's eye view or top down view of the vehicle 100 and the surrounding environment. The bird's eye view version of an image can depict the second vehicle 102 in relation to the road ahead and any cross streets or intersections as well as other vehicles and objects in the road. As such, relative locations of the environmental features can be taken into account more efficiently when determining future trajectories of the second vehicle 102.

Thus, the processing device 120 can receive the bird's eye view into from the imaging device 110 to generate a prediction of future trajectories of the second vehicle 102. The processing device 120 can include, e.g., a computing system such as, e.g., a processor, a memory device, a storage device and other components of a computing device. As a result, the bird's eye view can be stored in a memory or a storage component of the processing device such that the processing device 120 can implement an energy-based modeler 200 including with the processing device 120 in, e.g., a memory or storage and executed by a processor. The energy-based modeler 200 models a distribution of a variety of possible future trajectories through the bird's eye view of the second vehicle 102.

The energy-based modeler 200 can implement energy analysis on the bird's eye view image to determine the most probably future trajectories. For example, embodiments of the present invention can include, e.g., assigning energy values to various locations and objects in the image, where energies of objects other than a road is increased and the energy associated with the road is pushed down. Through training, the energies associated with various objects can be adjusted, including decreasing an energy measure for true trajectories obtained from, e.g., a training data set.

Using the energies, most likely future trajectories can be modeled by minimizing the energy. The energies, therefore, can provide a goal-oriented methodology to trajectory prediction where the second vehicle 102 is assumed to behave according to the least energy usage. Such a methodology takes into account the underlying uncertainty of the future behavior of the second vehicle 102, and models potential future trajectories in view of the uncertainty. Accordingly, lower energy trajectories are considered to have a higher probability of occurrence. As a result, the energy-based modeler 200 takes into account the environment to determine the most likely future trajectory of the second vehicle 102 according to a determination of the most desirable trajectories based on the energy corresponding to the features of the environment.

The predicted future trajectories can be analyzed and acted upon by an autonomous navigation system 600. The autonomous navigation system 600 can be included with the processing device 120, or as a separate system such as, e.g., a computer processing system including, e.g., a processor, a storage device, a memory device, among other computer processing components.

The autonomous navigation system 600 receives the future trajectories and determines a future behavior of the second vehicle 102 that may affect the vehicle's 100 behavior. For example, the autonomous navigation system 600 can recognize, e.g., an unsafe lane change, an improper or illegal turn, a collision, or other unsafe behavior. In recognizing the trajectory, the autonomous navigation system 600 can autonomously control the vehicle 100 to take appropriate action, such as, e.g., evasive action, applying brakes, accelerating ahead, among other actions. For example, autonomous navigation system 600 can use a combination of the steering system 602 of the vehicle, including, e.g., a power steering device, actuator, or motor, a steering rack and/or a steering wheel, as well as the throttle 604, including, e.g., actuators for fuel valves, and the brakes 606 of the vehicle 100 to perform autonomous maneuvers to avoid a hazardous situation. Accordingly, the autonomous navigation system 600 can utilize the predicted future trajectories from the energy-based modeler 200 to quickly and efficient determine a safe driving behavior of the vehicle 100 by taking into account the future probable behaviors of the second vehicle 102.

Figure 7:
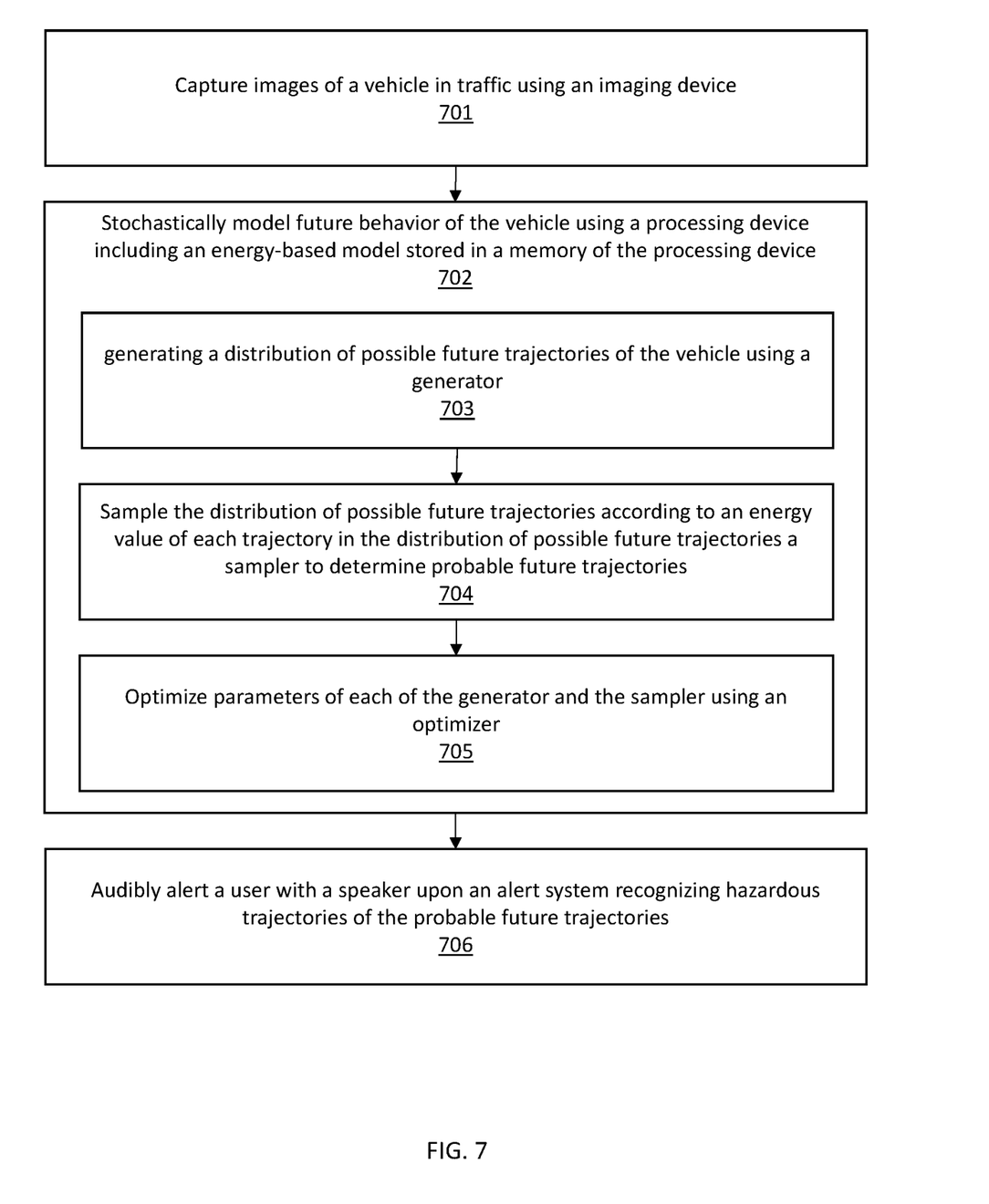
FIG. 7 is a flow diagram illustrating a system/method for vehicle behavior prediction with driver alerts, in accordance with the present principles.

Referring now to FIG. 7, a system/method for vehicle behavior prediction with driver alerts is illustratively depicted in accordance with an embodiment of the present principles.

At block 701, capturing images of a vehicle in traffic using an imaging device.

At block 702, stochastically modeling future behavior of the vehicle using a processing device including an energy-based model stored in a memory of the processing device, the energy-based model including.

At block 703, generating a distribution of possible future trajectories of the vehicle using a generator.

At block 704, sampling the distribution of possible future trajectories according to an energy value of each trajectory in the distribution of possible future trajectories a energy model to determine probable future trajectories.

At block 705, optimizing parameters of each of the generator and the energy model using an optimizer.

At block 706, audibly alerting a user with a speaker upon an alert system recognizing hazardous trajectories of the probable future trajectories.

The foregoing is to be understood as being in every respect illustrative and exemplary, but not restrictive, and the scope of the invention disclosed herein is not to be determined from the Detailed Description, but rather from the claims as interpreted according to the full breadth permitted by the patent laws. It is to be understood that the embodiments shown and described herein are only illustrative of the principles of the present invention and that those skilled in the art may implement various modifications without departing from the scope and spirit of the invention. Those skilled in the art could implement various other feature combinations without departing from the scope and spirit of the invention. Having thus described aspects of the invention, with the details and particularity required by the patent laws, what is claimed and desired protected by Letters Patent is set forth in the appended claims.

What is claimed is:

1. A system including an autonomous drone with object behavior prediction, the system comprising:
    an imaging device that captures images of a vehicle in traffic;
    a processing device including an energy-based model stored in a memory of the processing device to stochastically model future behavior of the vehicle, the energy-based model including:
        a generator that produces a distribution of possible future trajectories of the vehicle;
        a energy model that samples the distribution of possible future trajectories according to an energy value of each trajectory in the distribution of possible future trajectories to determine probable future trajectories;
        an optimizer that optimizes parameters of each of the generator and the energy model; and
    an autonomous navigation system that recognizes hazardous trajectories of the probable future trajectories and avoiding the hazardous trajectories.

2. The system as recited in claim 1, wherein the generator includes a reactive stochastic policy.

3. The system as recited in claim 1, wherein the generator includes:
    a first multilayer perceptron for modeling static information to generate static predictions;
    a recurrent neural network for modeling dynamic information to generate dynamic predictions; and
    a second multilayer perceptron for generating a future trajectory from the static predictions and the dynamic predictions.

4. The system as recited in claim 1, wherein the energy model includes a negative entropy module to generate a log probability density of each trajectory in the distribution of possible future trajectories.

5. The system as recited in claim 4, wherein the energy-based model trains the generator by:
    generator the distribution of possible future trajectories using the generator;
    energy sampling the distribution of possible future trajectories using the energy model;
    negative entropy sampling the distribution of possible future trajectories using the negative entropy module; and
    optimizing generator parameters using gradient descent according to a sum of the negative entropy sampling and the energy sampling.

6. The system as recited in claim 1, wherein the energy model samples the distribution of possible future trajectories by generating a cost map of energies for each feature in an environment depicted in the images.

7. The system as recited in claim 1, wherein the imaging device includes an image recognition system to perform semantic segmentation on the images and identify features of an environment depicted in the images.

8. The system as recited in claim 7, wherein the image recognition system generates a bird's eye view image corresponding to each image captured by the imaging device.

9. The system as recited in claim 1, wherein the optimizer alternates between updating generator parameters corresponding to the generator and updated energy parameters corresponding to the energy model according to adversarial optimization.

10. The system as recited in claim 1, wherein the energy-based model trains the energy model by:
generating energies with the energy model for each trajectory in each of the distribution of possible future trajectories and a training distribution; and
updating energy parameters according to adversarial optimization between the energies of the possible future trajectories and the energies of the training distribution.

11. A method for autonomous drone operation with object behavior prediction, the method comprising:
capturing images of a vehicle in traffic using an imaging device;
stochastically modeling future behavior of the vehicle using a processing device including an energy-based model stored in a memory of the processing device, the energy-based model including:
generating a distribution of possible future trajectories of the vehicle using a generator;
sampling the distribution of possible future trajectories according to an energy value of each trajectory in the distribution of possible future trajectories a energy model to determine probable future trajectories;
optimizing parameters of each of the generator and the energy model using an optimizer; and
autonomously navigating an environment using an autonomous navigation system that recognizes hazardous trajectories of the probable future trajectories and avoiding the hazardous trajectories.

12. The method as recited in claim 11, wherein the generator includes a reactive stochastic policy.

13. The method as recited in claim 11, wherein the generator includes:
a first multilayer perceptron for modeling static information to generate static predictions;
a recurrent neural network for modeling dynamic information to generate dynamic predictions; and
a second multilayer perceptron for generating a future trajectory from the static predictions and the dynamic predictions.

14. The method as recited in claim 11, wherein the energy model includes a negative entropy module to generate a log probability density of each trajectory in the distribution of possible future trajectories.

15. The method as recited in claim 14, wherein the energy-based model trains the generator by:
generator the distribution of possible future trajectories using the generator;
energy sampling the distribution of possible future trajectories using the energy model;
negative entropy sampling the distribution of possible future trajectories using the negative entropy module; and
optimizing generator parameters using gradient descent according to a sum of the negative entropy sampling and the energy sampling.

16. The method as recited in claim 11, wherein the energy model samples the distribution of possible future trajectories by generating a cost map of energies for each feature in an environment depicted in the images.

17. The method as recited in claim 11, wherein the imaging device includes an image recognition system to perform semantic segmentation on the images and identify features of an environment depicted in the images.

18. The method as recited in claim 17, wherein the image recognition system generates a bird's eye view image corresponding to each image captured by the imaging device.

19. The method as recited in claim 11, wherein the optimizer alternates between updating generator parameters corresponding to the generator and updated energy parameters corresponding to the energy model according to adversarial optimization.

20. The method as recited in claim 11, wherein the energy-based model trains the energy model by:
generating energies with the energy model for each trajectory in each of the distribution of possible future trajectories and a training distribution; and
updating energy parameters according to adversarial optimization between the energies of the possible future trajectories and the energies of the training distribution.

* * * * *